United States Patent [19]

Fukumoto et al.

[11] Patent Number: 4,589,995

[45] Date of Patent: May 20, 1986

[54] MALEIC ACID COPOLYMER, PRODUCTION THEREOF AND SCALE-PREVENTING AGENT CONTAINING THE SAME

[75] Inventors: Yasuhisha Fukumoto, Wakayama; Noboru Moriyama, Utsunomiya; Takashi Itoi, Tochigi, all of Japan

[73] Assignee: Kao Corporation, Tokyo, Japan

[21] Appl. No.: 584,427

[22] Filed: Feb. 28, 1984

[30] Foreign Application Priority Data

Mar. 25, 1983 [JP] Japan ................................. 58-50006

[51] Int. Cl.$^4$ ........................ C02F 5/10; C07C 67/04; C07C 69/593

[52] U.S. Cl. ................................... 252/180; 560/198; 560/199; 560/200; 252/80

[58] Field of Search ............... 560/199, 200, 198; 252/82, 180

[56] References Cited

U.S. PATENT DOCUMENTS 1,921,756  8/1933  Kienle ................................ 560/199

*Primary Examiner*—Natalie Trousof
*Assistant Examiner*—Vera C. Clarke
*Attorney, Agent, or Firm*—Flynn, Thiel, Boutell & Tanis

[57] ABSTRACT

Disclosed is a novel copolymer of maleic acid or a salt thereof and an adduct of an oxyalkylene and allyl alcohol, a molar ratio being from 5/100 to 50/50, a molecular weight thereof being from 400 to 20,000. The copolymer is useful as a scale-preventing agent.

3 Claims, 2 Drawing Figures

MALEIC ACID COPOLYMER, PRODUCTION THEREOF AND SCALE-PREVENTING AGENT CONTAINING THE SAME

This invention relates to a copolymer of maleic acid (hereinafter, abbreviated as MA) and a polyoxyalkylene monoallyl ether (hereinafter, abbreviated as POA), its production and a scale preventing agent comprising said copolymer. Heretofore, polymaleic acids and copolymers thereof with, for example, styrene, vinyl acetate or alphaolefin, have been used as a scale-preventing agent, a dispersant or the like, though they are not satisfactory in respect to performances to be required.

Recently, Japanese Patent Publication No. 570804/1982 has disclosed a copolymer having an acrylamide(AA) to MA molar ratio, AA/MA, ranging from 70/30 to 30/70. Moreover, Japanese Patent Laid-Open No. 57706/1982 has disclosed a copolymer having a polyethylene glycol monoallyl ether (PE) to MA molar ratio, PE/MA, ranging from 40/60 to 60/40. Even these copolymers, however, are not satisfactory as yet in respect of performances and there seems to be much room for improvement.

Polymaleic acid or copolymers of MA with other copolymerizable monomers are produced, in most cases, in organic solvents such as toluene or benzene, though the production in an aqueous solvent is far better than that in an organic solvent from the viewpoint of the simplification of a production process, cost reduction and fire prevention.

As a result of further studies made under these circumstances concerning maleic acid copolymers, the inventors of this invention have found a novel copolymer of MA with POA having a prominent scale preventing effect and a process for producing the same and have completed this invention.

Namely, this invention provides a novel maleic acid copolymer comprising repeating structural units represented by the general formula (I):

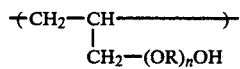
(I)

wherein OR represents an oxyalkylene group of 2 or 3 carbon atoms, and n represents an integer of from 1 to 50, and repeating structural units represented by the general formula (II):

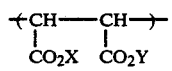
(II)

wherein X and Y represent each hydrogen, a monovalent metal, a bivalent metal, an ammonium group or an organic amine group, wherein the molar ratio of the total of units (I) to that of units (II) ranges from 5/100 to 50/100, and the average molecular weight is from 400 to 20,000. This invention also provides a process for producing the abovementioned novel maleic acid copolymer, characterized in that in the production of a copolymer by copolymerizing a polyoxyalkylene monoallyl ether represented by the general formula (III):

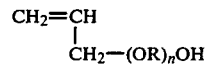
(III)

wherein OR represents as oxyalkylene group of 2 or 3 carbon atoms and n represents an integer of from 1 to 50, with maleic acid represented by formula (IV):

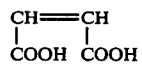
(IV)

or its anhydride in the presence of a polymerization initiator, said compounds (III) and (IV) are copolymerized in an aqueous solution maintained at a pH of from 2.5 to 6.0 with the aid of one or more basic compounds selected from the group consisting of alkali metal compounds, alkaline earth metal compounds, ammonia and organic amine compounds, as well as a scale preventing agent comprising said novel maleic acid copolymer.

Unlike acrylic and methacrylic acid which have high homopolymerizability, MA and POA which constitute the copolymer of this invention have extremely low homopolymerizability and, therefore, have heretofore been believed to form alternating copolymers. In fact, although the above-mentioned Japanese Patent Laid-Open No. 57706/1982 discloses a process for producing a copolymer of MA and a polyethylene glycol monoallyl ether, it may be presumed that the copolymers which can be produced are alternating copolymers, judging from the fact that the above monomers are charged in equimolar amounts to effect copolymerization in all of the examples. On the contrary, the maleic acid copolymer of this invention is a novel one having a (I) to (II) molar ratio ranging from 5/100 to 50/100, a high maleic acid content and an average molecular weight of from 400 to 20,000, and can be obtained in good yields by copolymerizing MA with POA in an aqueous solution maintained at a pH of from 2.5 to 6.0 with the aid of a basic compound such as an alkali metal compound or ammonia. Within this pH range, almost all of the MA exists in the form of monosalt of maleic acid.

The production process of this invention will be described in more detail. First, a basic compound such as sodium hydroxide, potassium hydroxide or ammonia water is added to an aqueous solution or aqueous dispersion of MA or maleic anhydride or to an aqueous solution or aqueous suspension containing MA and POA or maleic anhydride and POA to adjust the pH of the solution to a value of from 2.5 to 6.0, preferably from 3.5 to 5.0. Thereafter, a polymerization initiator and, if necessary, POA are added and the resulting mixture is polymerized. When the pH is below 2.5 or above 6.0, a copolymer having a POA molar ratio higher than that in the feed is formed and the polymer conversion is low so that such a process can not be practical.

The POA may be added at once to the reaction system before the polymerization reaction is started, or may be continuously added during the polymerization through a nozzle. The polymerization initiators which can be used in the copolymerization reaction include, for example, hydroperoxides such as t-butyl hydroperoxide; persulfates such as ammonium persulfate; hydrogen peroxide, and water-soluble azobis compounds.

Though there is no particular limitation on the polymerization temperature, monomer concentration and reaction time for the production, usually the polymerization temperature preferably ranges from 60° to 160° C. With respect to the monomer concentration, it is practical to select it so that a solids concentration of from 30 to 60% by weight can be obtained, and with respect to the reaction time, it is suitably 2 to 10 hours.

In the production process of this invention, water is used as a polymerization solvent, but it is also possible to add a small amount of an organic solvent such as ethanol, isopropanol, methyl ethyl ketone, methyl isobutyl ketone or ethyl acetate so far as the polymer conversion is not adversely affected.

According to this process, it is possible to produce the copolymer of this invention efficiently and easily. The reason for this, though not apparent, is thought to be as follows. Within the pH range used in this invention, almost all of the MA exists in the form of a monosalt of maleic acid, and this salt forms intramolecular hydrogen bonds in an aqueous solution and takes the form of a planar structure. This causes an increase in its radical resonance stabilization with consequent heightened polymerizability and further causes a decrease in the polar effect owing to its anionic property, making it difficult to form an alternating copolymer of maleic anhydride or MA with POA.

The novel maleic acid copolymer of this invention is particularly effective as a scale preventing agent which is used to prevent the deposition of scale in boilers and seawater desalination apparatuses.

The amount of the copolymer of this invention used as a scale preventing agent varies with use, but it is usually 0.1 to 100 ppm based on water.

Moreover, the copolymer of this invention can exhibit excellent characteristics also for use as detergent builders, dispersants, etc.

A copolymer having the above mentioned (I) to (II) molar ratio outside the range of from 5/100 to 50/100, and a copolymer in which the number of moles of added alkylene oxide in POA, n, is above 50 have a poorer scale preventing effect, while the production of a copolymer having an average molecular weight of below 400 or above 20,000 is extremely difficult even when the production process of this invention is applied. The oxyalkylene chain in the formula (III), $-(OR)_n-$, preferably includes oxyethylene, oxypropylene and a block or random units of oxypropylene and oxypropylene. Then it may contain up to 20 mol %, based on the total of the oxyalkylene units, of oxybutylene.

Figure 1:
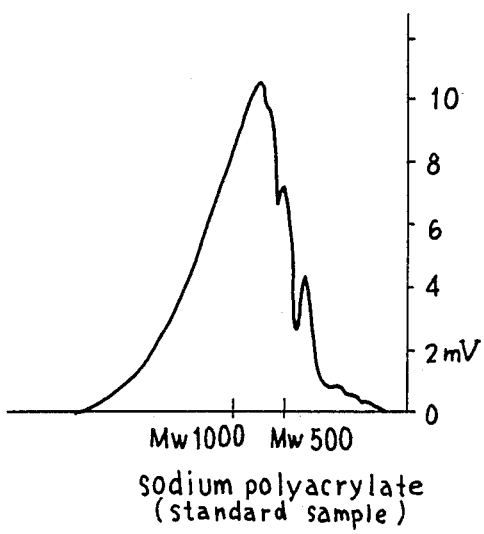
FIG. 1 is a gel permeation chromatogram of the copolymer of Experiment No. 1.
Figure 2:
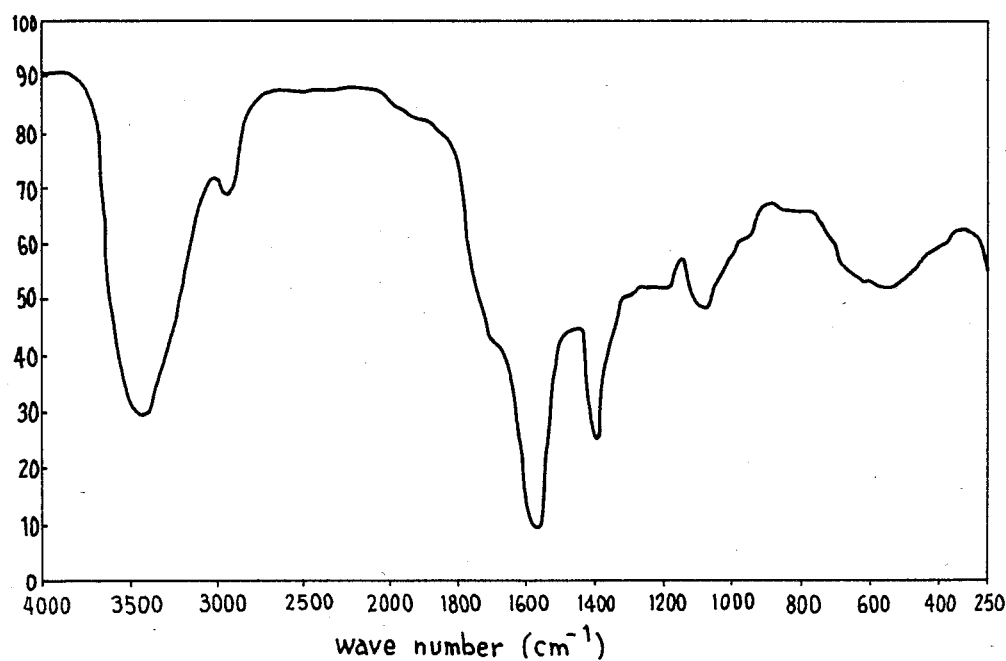
FIG. 2 is an IR spectrum thereof.

This invention will now be described in further detail with reference to examples, but it should be noted that this invention should by no means be limited to these examples.

EXAMPLE 1

A 500-1 stainless autoclave was charged with 98 g (1.0 mol) of maleic anhydride, 144 g of water, 103 g (1.03 mol as pure caustic soda) of a 40% aqueous caustic soda solution, and 64.4 g (0.2 mol) of POA having an average of six ethylene oxide units per molecule, then nitrogen was introduced into the autoclave under agitation and the system was heated to a temperature of 90° C. Thereafter, a small portion of the solution was taken and diluted with water to obtain an aqueous solution having a monomer concentration of 5% by weight. The pH of the aqueous solution was found to be 4.06 (measurement temperature 35° C). Then, 16 g of a 70% aqueous t-butyl hydroperoxide solution as a polymerization initiator was introduced into the system through a sample inlet tube, the stream of nitrogen was stopped, the autoclave was sealed and the reaction mixture was stirred for 5 hours at 120° C. Thereafter, the solution was cooled to below 50° C. and measured for a pH, with the result of 5.1. Then, a 40% aqueous caustic soda solution and water were added to said solution to obtain an aqueous copolymer salt solution finally having a solids content of 40% and a pH of 7.2 (Experiment No. 1). Its polymer conversion was determined by the determination of the remaining monomer according to a bromine-bromide method. Further, gel permeation chromatography was carried out to obtain the results shown in Table 1. The precipitate obtained by precipitating the copolymer from methanol and filtering the precipitate was dried, formed into KBr pellets and examined for its infrared absorption spectrum. The result is shown in Table 2.

As comparative examples, the production of copolymers was carried out in the same manner as above except that the amounts of caustic soda used for the neutralization of maleic acid were 30 g (0.3 mol) (Experiment No. 2) and 200 g (2.0 mol) (Experiment No. 3). The conversions and average molecular weights of the copolymers produced are shown in Table 1.

TABLE 1

| Experiment No. | POA/MA (molar ratio) | Neutralization degree of maleic acid (maleic acid/ NaOH molar ratio) | Initial pH | Final pH | Conversion (mol %) | Average MW*[1] |
|---|---|---|---|---|---|---|
| 1 | 20/100 | 1.00/1.03 | 4.06 | 5.10 | 98.1 | 950 |
| 2 | 20/100 | 1.00/0.3 | 1.82 | 1.91 | 62.6 | — |
| 3 | 20/100 | 1.00/2.00 | 10.8 | 11.10 | 70.4 | — |

Experiment No. 1: Example of this invention
Experiment Nos. 2 and 3: Comparative examples
Because of the low polymer conversions, the determination of molecular weights were not made in Comparative Examples.
*[1]Average MW: A sodium salt of a polymer was diluted with deionized water to form a mixture of a concentration of 500 mg (solids)/100 ml. A 100 μl portion of this mixture was taken and a number-average molecular weight was determined by means of gel permeation chromatography under conditions including an aqueous column G 4000 PW/G 2000 SW (a product of Toyo Soda Co., Ltd.), a 0.15 M phosphate buffer solution (pH 7.0) and room temperature. A spectrophotometric detector SPD-1 (a product of Shimadzu Seisakusho Ltd.) was used as a detector to measure the light absorption at a wavelength of 215 nm.

The same measurements were followed in the examples set forth below.

EXAMPLE 2

In a flask fitted with a thermometer, agitator, dropping funnel, nitrogen inlet tube and reflux condenser, 294 g (3.0 mol) of maleic anhydride and 315 g of water were added, and then 309 g (3.09 mol of pure caustic soda) of 40% caustic soda was added to the mixture under agitation. A small portion of this solution was taken and diluted with water so that the diluted solution had a solids content of 3% by weight. The pH of this solution was found to be 4.12 (measurement temperature 35° C.).

Thereafter, a one fourth portion of 228 g (1.2 mol) of POA having an average of three ethylene oxide units per molecule was placed in the flask, and the system was heated to 100° C., while nitrogen was being introduced thereto. Then, a mixture of 18.8 g of ammonium sulfate and 143 g of 35% hydrogen peroxide was added thereto dropwise over 4 hours.

Simultaneously with the addition of the mixture, the remaining portion of the PVA was added thereto dropwise from a separate dropping funnel. After completion of the addition of the mixture, the system was aged for further one hour and then cooled to below 40° C. The pH of the solution was found to be of 5.20. Thereafter, 40% caustic soda and water were added to obtain an aqueous copolymer solution finally having a solids content of 40% and a pH of 7.5. The polymer conversion and average molecular weight of the produced copolymer are shown in Table 2.

TABLE 2

| Experiment No. | POA/MA (molar ratio) | Neutralization degree of maleic acid (maleic acid/ NaOH molar ratio) | Initial pH | Final pH | Conversion (mol %) | Average MW |
|---|---|---|---|---|---|---|
| 4 | 40/100 | 1.00/1.03 | 4.12 | 5.20 | 94.2 | 1250 |

EXAMPLE 3

The same reactor as used in Example 1 was charged with 147 g (1.5 mol) of maleic anhydride, 113 g of water, 154.5 g (1.55 mol) of a 40% aqueous caustic soda solution and 67.2 g (0.3 mol) of POA containing an average of 10 ethylene oxide units per molecule, nitrogen was introduced into the reactor under agitation, and the system was heated to a temperature of 90° C. An aqueous solution having a monomer concentration of 5% by weight at this time had a pH of 4.10. 30 g of a 70% aqueous t-butyl hydroperoxide solution as a polymerization initiator was introduced into the system through a sample inlet tube, then the nitrogen stream was stopped, the autoclave was sealed, and the system was agitated at 120° C. for 5.0 hours. After cooling to below 50° C., the system was measured for a pH with the result of 5.10. Then, 40% caustic soda and water were added to obtain an aqueous copolymer salt solution finally having a solids content of 50% and a pH of 7.6. The polymer conversion and average molecular weight of the produced copolymer are shown in Table 3.

TABLE 3

| Experiment No. | POA/MA (molar ratio) | Neutralization degree of maleic acid (maleic acid/ NaOH molar ratio) | Initial pH | Final pH | Conversion (mol %) | Average MW |
|---|---|---|---|---|---|---|
| 5 | 20/100 | 1.00/1.03 | 4.10 | 5.10 | 97.0 | 1100 |

EXAMPLE 4

The effect of the copolymers of this invention as the scale preventing agent in boiling seawater were tested.

First, there was prepared an artificial seawater having the following components and a seawater salt concentration which was four times as much as that of ordinary seawater.

| | |
|---|---|
| Distilled water | 839.2 g |
| NaCl | 93.6 g |
| $MgCl_2.6H_2O$ | 44.0 g |
| $Na_2SO_4$ | 16.0 g |
| $CaCl_2.2H_2O$ | 6.4 g |
| $NaHCO_3$ | 0.8 g |

Then, 1 kg of the artificial seawater was placed in a 1-l separable flask containing a Teflon stirrer piece of a known weight. A scale preventing agent was added to this flask in an amount to provide a concentration of 10 ppm, and the flask was placed at once in an oil bath of 135° C. The seawater was boiled while the stirrer piece was being rotated slowly to prevent the bumping of the seawater. After the seawater had reached 101° C., it was maintained at this temperature for 2 hours. After cooling with chilled water, the seawater was filtered through a membrane filter having an opening of 0.3 μ to leave the scale contained in the seawater and the stirrer piece on the filter. Further, the scale deposited on the inside wall of the flask was scraped off thoroughly and collected on the filter, and the filter was washed with pure water and dried. The amount of the scale left on the filter and the stirrer piece was measured. These results are shown in Table 4.

TABLE 4

| | Scale preventing agent | Concentration of scale preventing agent added (ppm) | Amount of scale formed (mg) |
|---|---|---|---|
| This invention | Copolymer of Exper. No. 1 | 10 | 10.2 |
| | Copolymer of Exper. No. 4 | 10 | 15.6 |
| | Copolymer of Exper. No. 5 | 10 | 16.3 |
| Comparative | Commercially available polymaleic acid (MW 500) | 10 | 18.3 |

TABLE 4-continued

| Scale preventing agent | Concentration of scale preventing agent added (ppm) | Amount of scale formed (mg) |
|---|---|---|
| Sodium polyacrylate (MW 3000) | 10 | 624.5 |
| Maleic acid/polyethylene glycol monoallyl ether (EOP = 5) = 100/100 (MW 800) | 10 | 207.3 |
| No addition | 0 | 1682.3 |

The embodiments of the invention in which an exclusive property or privilege is claimed are defined as follows.

1. A maleic acid copolymer which comprises repeating structural units of the formula (I):

$$\mathrm{+CH_2-CH-\!\!\!+} \atop \mathrm{CH_2-(OR)_nOH} \qquad (I)$$

wherein OR represents an oxyalkylene group of 2 or 3 carbon atoms and n represents an integer of from 1 to 50, and repeating structural units of the formula (II):

$$\mathrm{+CH-\!\!\!-CH-\!\!\!+} \atop \mathrm{CO_2X \quad CO_2Y} \qquad (II)$$

wherein X and Y each represent hydrogen, an alkali metal, an alkaline earth metal, an ammonium group or an organic amino group, wherein the molar ratio of the total number of units of formula (I) to that of units of formula (II) ranges from 5/100 to 50/100, and the number average molecular weight is from 400 to 20,000.

2. A process for producing a maleic acid copolymer which comprises repeating structural units of the formula (I):

$$\mathrm{+CH_2-CH-\!\!\!+} \atop \mathrm{CH_2-(OR)_nOH} \qquad (I)$$

wherein OR represents an oxyalkylene group of 2 or 3 carbon atoms and n represents an integer of from 1 to 50, and repeating structural units of the formula (II):

$$\mathrm{+CH-\!\!\!-CH-\!\!\!+} \atop \mathrm{CO_2X \quad CO_2Y} \qquad (II)$$

wherein X and Y each represent hydrogen, an alkali metal, an alkaline earth metal, an ammonium group or an organic amino group, wherein the molar ratio of the total number of units of formula (I) to that of units of formula (II) ranges from 5/100 50/100, and the number average molecular weight is from 400 to 20,000, which comprises copolymerizing a polyoxyalkylene monoallyl ether of the formula (III):

$$\mathrm{CH_2=CH} \atop \mathrm{CH_2-(OR)_nOH} \qquad (III)$$

wherein OR represents an oxyalkylene group of 2 or 3 carbon atoms and n represents an integer of from 1 to 50, with maleic acid of the formula (IV):

$$\mathrm{CH=\!\!=CH} \atop \mathrm{COOH \quad COOH} \qquad (IV)$$

or its anhydride, in the presence of a polymerization initiator said compounds (III) and (IV) being copolymerized in an aqueous solution maintained at a pH of from 2.5 to 6.0 by addition of one or more basic compounds selected from the group consisting of alkali metal compounds, alkaline earth metal compounds, ammonia and organic amine compounds.

3. A method for the prevention of deposition of scale which comprises adding to water, in an amount effective to prevent scale from depositing on surfaces in contact with the water, the maleic acid copolymer as defined in claim 1.

* * * * *

UNITED STATES PATENT AND TRADEMARK OFFICE
CERTIFICATE OF CORRECTION

PATENT NO.   :   4 589 995

DATED        :   May 20, 1986

INVENTOR(S)  :   Yasuhisha FUKUMOTO et al

It is certified that error appears in the above-identified patent and that said Letters Patent is hereby corrected as shown below:

Column 8, line 21; change "5/100 50/100," to
---5/100 to 50/100,---.

Signed and Sealed this

Twenty-first Day of October, 1986

[SEAL]

Attest:

DONALD J. QUIGG

Attesting Officer

Commissioner of Patents and Trademarks